United States Patent

[11] 3,594,886

| [72] | Inventor | Philip E. Barnes<br>North Granby, Conn. |
|---|---|---|
| [21] | Appl. No. | 817,457 |
| [22] | Filed | Apr. 18, 1969 |
| [45] | Patented | July 27, 1971 |
| [73] | Assignee | United Aircraft Corporation<br>East Hartford, Conn. |

[54] METHOD OF FABRICATING VALUE MODULE
3 Claims, 2 Drawing Figs.

[52] U.S. Cl. .................................................. 29/157.1 R,
251/143
[51] Int. Cl. .................................................. F16k 27/10
[50] Field of Search .......................................... 251/143,
366; 137/1, 269, 329, 340, 375, 625.68, 625.69;
29/157.1

[56] References Cited
UNITED STATES PATENTS
2,227,542  1/1941  Glove .......................... 251/366 X

*Primary Examiner*—William R. Cline
*Attorney*—Laurence A. Savage

ABSTRACT: Miniaturized fluid components are provided by modules in which valve sleeves may be disposed in any orientation, the valve sleeves having no O-seals between them and the housing, and in which tubing is utilized to support and interconnect various valves and components within the module and to interconnect modules with supply and drain headers; and by a plurality of modules disposed on a construction made up of two plates between which are disposed the supply and drain tubes to which the modules are connected.

PATENTED JUL 27 1971    3,594,886

INVENTOR
PHILIP E. BARNES
BY Laurence A. Savage
AGENT

METHOD OF FABRICATING VALUE MODULE

BACKGROUND OF THE INVENTION

1. Field of the Invention

This invention relates to fluid components, both hydraulic and pneumatic, and particularly to the miniaturization and dense, low-volume, low-weight packaging thereof.

2. Description of the Prior Art

Present fluid components are relatively heavy, of large volume and containing many elements which tend to reduce their overall reliability. For example, components such as hydraulic valves generally have cast or forged housings and passages in the housing or connecting various parts must be drilled straight or are cast. These features contribute to the size and weight of the overall assembly. Further, valve sleeves have O-seals which cause a lengthened valve and tend to increase the valve diameter above the functionally required size; it is normally not desirable to produce straight bores and spools with a length-to-diameter ratio greater than 5 to 1. The elimination of O-seals would also greatly improve component reliability. I have found a way to solve all these problems and thereby to reduce the size and weight of fluid components, while at the same time increasing the reliability thereof.

SUMMARY OF THE INVENTION

It is an object of the present invention to miniaturize fluid components while also increasing their reliability.

It is also an object of the present invention to provide a means of making a fluid component module in which as many valves as possible may be placed in a densely packed module.

It is also an object of the present invention to provide a method of "modularizing" a fluid subsystem to provide a lightweight, small volume rigid structure.

In accordance with the present invention the above objects are attained by a hydraulic component module in which there are no O-seals between a valve sleeve and the housing, or module, in which it is disposed. By removing the O-seals from the valve sleeve the component length can be greatly reduced, as will be understood by anyone skilled in the art. Furthermore, because the length is reduced, the valve spool diameter can also be reduced (normally it is not feasible to produce straight valve bores and valve spools with a length-to-diameter ratio greater than 5 to 1). Thus weight and volume can be reduced, and the component reliability improved because of the elimination of O-seals.

In further accord with the present invention dense packaging of valves in a module is attained by utilizing tubing to interconnect various valves, components and supply and drain lines. The tubing may be bent to any desirable shape, around other objects within the module, etc., thus eliminating the normal spacial requirements for drilling straight lines in a cast or forged housing as is the usual method, or the spacial requirements for cast lines within the housing. In this manner very dense packaging of components is attained. A thin shell housing is placed around the various valves and components connected by the tubing. When this assembly is brazed together, there is formed a rigid structure, supported by the tubing and the shell.

In further accord with the present invention, various modules may be placed on a plate or board and interconnected with tubing disposed within the plate structure. Header tubes, such as supply tubes and drain tubes, are disposed between two plates or boards, or may be disposed on the surface of one plate or board. The header tubes are brazed to connecting tubes from the modules which are disposed on the plate or board, such as by bolting the module housing to the plate. If the plate takes the form of two sheets, with the header tubes sandwiched therebetween and brazed thereto, considerable stiffness is obtained similar to the use of a "honeycomb" structure and considerable weight is saved over the usual cast or forged housings.

The foregoing objects, features and advantages of the present invention will become more apparent in light of the following detailed description of a preferred embodiment thereof, as illustrated in the accompanying drawings.

DESCRIPTION OF THE PREFERRED EMBODIMENT

Figure 1:
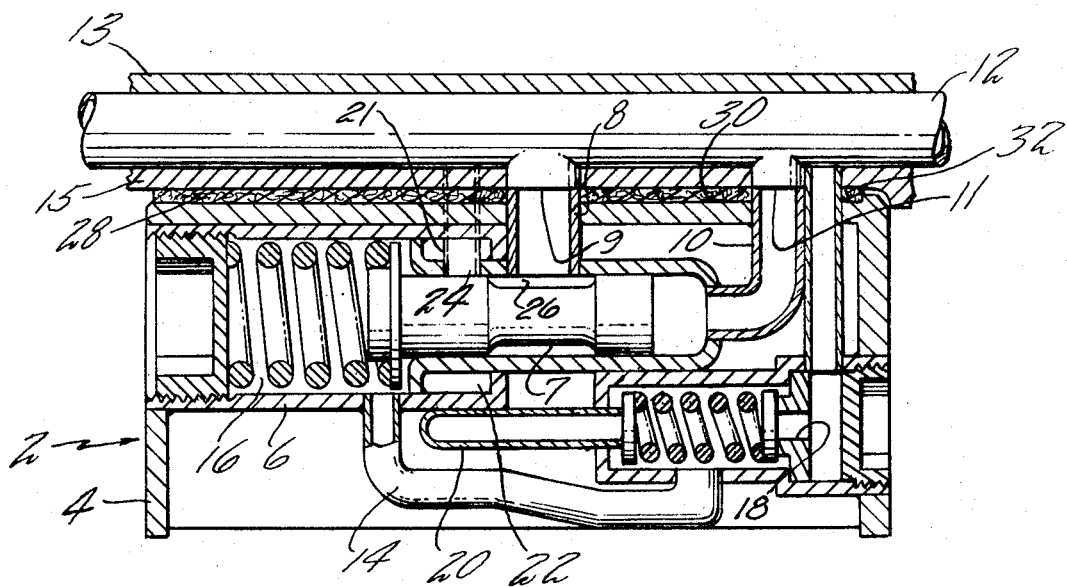
FIG. 1 is a sectioned elevation of a fluid component module in accordance with the present invention.

Referring now to FIG. 1, there is a fluid component module shown generally by the numeral 2. The module's housing is made up of a shell 4, which is a thin-wall structure. A valve sleeve 6, having a spool 7 slidably disposed therein, is disposed within the housing and tubes 8 and 10 are connected thereto. (It should be understood that the particular valve shown, a pressure regulating valve, forms no part of the invention itself; rather, the pressure regulating valve is shown merely as an example of a valve which could be packaged in a component module according to the teachings of my invention.) The other ends of the tubes 8 and 10 terminate in openings therefor in the shell housing. Connecting tubes 9 and 11, respectively, connect the tubes 8 and 10 to a header tube 12, disposed between two plates or sheets 13 and 15, which could be, for example, a supply tube. It should also be understood that more than one valve may be packaged in a single module, and that the valve sleeves may be disposed in any orientation within the shell, i.e., they need not be parallel or in any particular orientation with respect to each other. Other tubes may also be used to interconnect various valves or various chambers within the same valve; for example, the tube 14 connects the chamber 16 with the metering orifice 18, and the tube 21 connects the metering orifice 24 with the chamber 26 and leads flow to a drain (not shown). These tubes also may be bent to any desired shape, so as to go around the valve shown or around other valves or tubes in the module. Gaskets 28, 30 and 32 are provided for sealing between the various tubes passing out of the module and connecting with the header tube 12.

Figure 2:
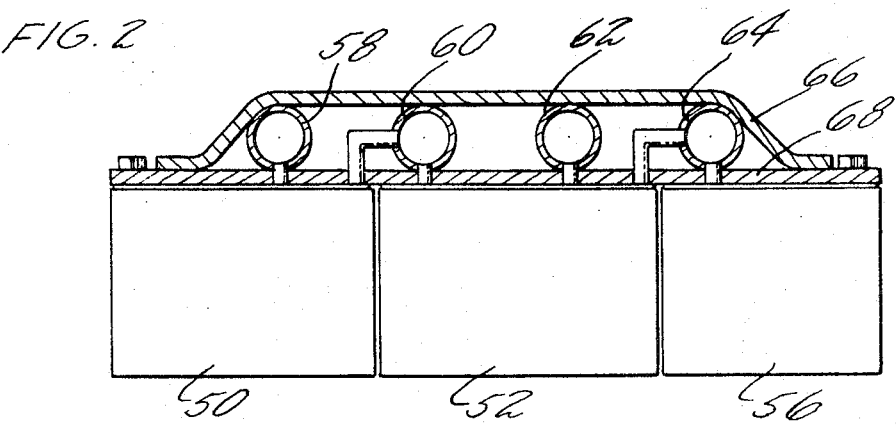
FIG. 2 is a schematic drawing showing a plurality of component modules assembled on a plate or board in accordance with the present invention.

In FIG. 2 there are shown a plurality of valve modules 50, 52 and 56 interconnected with header tubes 58, 60, 62 and 64. The header tubes are disposed between two plates 66 and 68. The connections in the assembly are brazed and the structure is very rigid, but light in weight, similar to a "honeycomb" structure.

My invention also teaches a unique method of constructing a valve module and mounting a plurality of valve modules to a plate and interconnecting the various tubes from the valves with the header tubes.

Referring again to FIG. 1, a typical module is assembled as follows:

A thin-walled shell housing 4 is formed and a valve sleeve 6, for example, is positioned in the housing by means of a ceramic rod (not shown) or a rod of any material which is not susceptible to being brazed to the housing or valve sleeve when the final assembly is brazed. Next, the tubing 8, 10, 14 and 22 is disposed in the shell, (the tubing having been bent to its desired shapes beforehand,) and connected to the valve sleeve by pressing the ends of the tubing into the sleeve, for example. The entire module is then brazed, and the ceramic bar is removed. As an additional step, the voids in the shell may be filled with potting compound, such as are well known in the electronic component art; the potting compound provides both secondary sealing and rigidity to the structure without adding much additional weight. However, that step is optional since the brazed structure itself is very rigid.

As shown in FIG. 1, a module constructed according to the above-described method may be affixed to a plate 15 and the tubes 8 and 10 connected to a header tube 12 via connecting tubes 9 and 11, respectively, and a second plate 13 placed on the other side thereof. This assembly is then brazed together. As shown in FIG. 2, a plurality of these modules 50, 52 and 56 may be assembled together on a plate 68 with header tubes 58, 60, 62 and 64 sandwiched between the plate 68 and a second plate 66. This assembly is also brazed together to form a rigid, lightweight, low-volume assembly.

There has thus been described a preferred embodiment of a fluid component module in accordance with the present invention. While I have shown a particular type of valve disposed in the module, it should be understood by those skilled in the art that any type of valve and any number of valves may be utilized with my invention. Therefore, it should be understood by those skilled in the art that various changes and omissions in the form and detail thereof may be made therein without departing from the spirit and scope of the invention which is to be limited only as set forth in the following claims:

What I claim as new and desire to secure by Letters Patent of the United States of America is:

1. A method of assembling a plurality of fluid components including a spool valve element to form a module, comprising:
    forming a thin-walled shell housing;
    positioning a valve sleeve within the housing surrounding the spool valve element in any desired orientation;
    connecting a first tube at its first end to one of said valve sleeve adjacent a metering section of the spool valve;
    connecting a second tube at its first end to said valve sleeve adjacent one end of said spool valve;
    connecting the second ends of said first and second tubes with openings formed in said shell housing;
    interconnecting externally of said valve sleeve each of said first and second tubes at their first ends with a presized and preshaped tube; and
    brazing the entire module.

2. A method of assembling a fluid component module as recited in claim 1, additionally comprising the step of:
    filling the voids in the module with potting compound.

3. A method of assembling a plurality of fluid component modules as recited in claim 1, additionally comprising:
    supporting a header tube between two plates;
    disposing each of the modules on one of the plates;
    connecting said tube to said header tube with a connector tube; and brazing the header tubes to the plates and said connector tube to said header tube and to said plate.